United States Patent [19]

Pokhodenko et al.

[11] 3,961,026

[45] June 1, 1976

[54] METHOD OF PRODUCING BASIC ZIRCONIUM CARBONATE

[76] Inventors: Vladimir Nikiforovich Pokhodenko, ulitsa Tereshkovoi, 2, kv. 37; Ivan Nikiforovich Tselik, ulitsa Ostrovidova, 30, kv. 4, both of Odessa, U.S.S.R.

[22] Filed: Aug. 12, 1974

[21] Appl. No.: 497,149

Related U.S. Application Data

[63] Continuation of Ser. No. 295,267, Oct. 5, 1972, abandoned, which is a continuation of Ser. No. 71,342, Sept. 11, 1970, abandoned.

[52] U.S. Cl. ................................ 423/419
[51] Int. Cl.$^2$........................................ C01G 25/00
[58] Field of Search.................... 423/84, 85, 419

[56] References Cited

UNITED STATES PATENTS

| | | | |
|---|---|---|---|
| 2,201,508 | 5/1940 | Tyler | 423/84 |
| 2,316,141 | 4/1943 | Warner | 423/119 X |
| 3,510,254 | 5/1970 | Bell | 423/419 |
| 3,551,095 | 12/1970 | Blumenthal | 423/419 |

*Primary Examiner*—Earl C. Thomas
*Attorney, Agent, or Firm*—Haseltine, Lake & Waters

[57] ABSTRACT

A method of producing basic zirconium carbonate, characterized in that basic zirconium sulfate is reacted with ammonium carbonate or with an alkali carbonate in an aqueous medium.

6 Claims, No Drawings

METHOD OF PRODUCING BASIC ZIRCONIUM CARBONATE

This application is a Continuation application of Ser. No. 295,267, filed Oct. 5, 1972, which is a Continuation application of Ser. No. 71,342, filed Sept. 11, 1970, now abandoned.

The present invention relates to methods of producing zirconium compounds, and more particularly to methods of producing basic zirconium carbonate.

At present basic zirconium carbonate, being readily soluble both in mineral and organic acids, finds an ever wider application in industry for producing various zirconium compounds, as well as in the textile industry for impregnating fabrics with a view to imparting fastness and waterproof properties to the latter. However, no method of producing basic zirconium carbonate has been found so far, which could be considered effective and economically expedient.

The known method of producing basic zirconium carbonate, which depends on the precipitation thereof from acidulous aqueous solution of zirconium oxychloride with ammonium carbonate, has a number of disadvantages.

1. The gelatinous precipitate of basic zirconium carbonate which forms is very slow to filter and difficult to wash with water.

2. In order to obtain basic zirconium carbonate of adequate purity, it is necessary to carry out preliminary purification of industrial zirconium oxychloride solutions from iron, titanium, aluminum, and other admixtures, by evaporating the solution, crystallizing the oxychloride with subsequent filtration and washing the zirconium oxychloride crystals with concentrated hydrochloric acid, this being associated with considerable gas evolution and corrosion of the equipment.

3. The process requires great consumption of ammonium carbonate, both for neutralization of the zirconium oxychloride solution, and for the formation of the basic zirconium carbonate.

The main object of the present invention is to provide an effective and commercially expedient method of producing basic zirconium carbonate.

Another object of the invention is to provide easily available and inexpensive stock material for producing basic zirconium carbonate.

Said and other objects are accomplished by a method which, according to the invention, is characterized in that basic zirconium sulfate is used as a stock material, said basic zirconium sulfate being reacted with ammonium carbonate or an alkali carbonate in an aqueous medium. Ammonium carbonate is preferable in this case, since it ensures greater purity of the resulting desired product. The reaction between the said compounds proceeds at normal temperature and pressure.

For attaining a maximum yield of basic zirconium carbonate, it is recommended that the starting reactants be taken in such a molar ratio, that there should be about 0.8 mole of ammonium carbonate or an alkali carbonate per mole of $ZrO_2$ in the basic zirconium sulfate used as the stock material.

Greater quantities of ammonium carbonate or an alkali carbonate than those specified hereinabove may lead to losses of zirconium due to formation of complex zirconium carbonates which pass into the solution; in this connection considerable amounts of said carbonate prove to be undesirable.

The reaction of basic zirconium sulfate should be effected with an aqueous solution of said carbonate, the concentration of the latter being 9-10 wt.%. Such a concentration ensures the most favorable reaction conditions.

In the above-specified process the reaction of the formation of basic zirconium carbonate takes place in a solid phase, with the $SO_3$-group being substituted by the $CO_2$-group. The resulting product is a fine-crystalline precipitate of basic zirconium carbonate, which can be easily and rapidly separated by conventional filtration, the thus separated precipitate being then washed with water. The mother liquor remaining after the separation of the precipitate contains ammonium sulfate, which is used for obtaining basic zirconium sulfate.

Basic zirconium sulfate is an easily available stock material, and is an intermediate product of primary processing of zirconiferous ores to zirconium dioxide.

The herein-proposed method is expedient to be carried out in combination with a method of primary processing of zirconiferous ores to zirconium dioxide not only in view of the fact that the intermediate product of said processing, basic zirconium sulfate, is utilized, but also in view of the fact that the mother liquor after the separation of the basic zirconium carbonate precipitate is recycled to the process for the formation of basic zirconium sulfate. Hence, in the said process all the products are utilized, without any wastes.

The basic zirconium carbonate thus obtained is pure, since use is made of basic zirconium sulfate which is almost free from iron, titanium, and other admixtures. This can be explained by the fact that in the course of formation of basic zirconium sulfate said admixtures remain in solution, and the precipitate of basic zirconium sulfate is separated and washed with water. Such basic zirconium sulfate ensures the obtaining of basic zirconium carbonate, with not more than 0.6 wt.% of admixtures.

The main advantage offered by the method of the present invention consists in the obtaining of basic zirconium carbonate in a fine-crystalline form with a high content of $ZrO_2$ of about 67 wt.%, whereas in accordance with the method known heretofore a gelatinous precipitate of basic zirconium carbonate is obtained containing 40 wt.% of zirconium dioxide.

Thus, the present invention features a number of advantages over the prior-art method. The method of the present invention can be easily carried out in industry on a large scale.

For a better understanding of the present invention, given hereinbelow is an example of a specific embodiment of the method proposed herein.

10 kg of wet basic zirconium sulfate, which in the air-dried state contains 55% of $ZrO_2$, 21.4% of $SO_3$ and 23.6% of $H_2O$, are charged in a tank equipped with a stirrer, and then an aqueous solution of ammonium carbonate with a concentration of 68.1 g/lit. is poured thereinto. The ammonium carbonate is taken in such a quantity that the molar ratio is 0.8 mole of ammonium carbonate per mole of $ZrO_2$ in the stock material. After stirring at room temperature for 15 min., the pulp is filtered on a vacuum filtre, and the residue is washed free from $SO_4^{--}$ ions with water. The content of $ZrO_2$ in the mother liquor is 0.01 g, and in the washing water, 0.005 g/lit. The yield of the product is 99 percent. The obtained product is a white crystalline powder, completely soluble in acids and containing, in the air-dried state, 67% of $ZrO_2$, 6% of $CO_2$, and 27% of $H_2O$, which approximately corresponds to the formula $4ZrO_2.CO_2.11H_2O$.

The percentage of admixtures in the product is as follows:

$TiO_2$, 0.13; $Al_2O_3$, less than 0.015; CaO, 0.20; $SiO_2$, 0.08; $Fe_2O_3$, less than 0.01; MgO, less than 0.07 $P_2O_5$, 0.07. No sulfur has been detected.

What is claimed is:

1. A method of producing crystalline basic zirconium carbonate which approximately corresponds to the formula $4ZrO_2.CO_2.11H_2O$ comprising reacting basic zirconium sulfate with a carbonate selected from the group consisting of ammonium carbonate and an alkali carbonate in an aqueous medium at room temperature and pressure wherein the quantity of said reacting carbonate is 0.8 mole per mole of $ZrO_2$ contained in the basic zirconium sulfate.

2. A method as claimed in claim 1, wherein the carbonate has a concentration of 9–10 weight % in the aqueous medium.

3. A method of producing crytalline, acid-soluble, basic zirconium carbonate which approximately corresponds to the formula $4ZrO_2.CO_2.11H_2O$ comprising reacting basic zirconium sulfate which in the air-dried state contains 55% $ZrO_2$, 21.4% $SO_3$ and 23.6% $H_2O$ with 0.8 mole per mole of $ZrO_2$ in the basic zirconium sulfate of a carbonate selected from the group consisting of ammonium carbonate and an alkali carbonate in a concentration of 9–10 weight % in an aqueous medium at room temperature and pressure.

4. A method according to claim 1 wherein the basic zirconium carbonate contains up to 0.575 percent of contaminants.

5. Crystalline acid-soluble basic zirconium carbonate containing in the air-dried state about 67% $ZrO_2$, 6% $CO_2$ and 27% $H_2O$ and prepared by reacting basic zirconium sulfate with a carbonate selected from the group consisting of ammonium carbonate and an alkali carbonate in an aqueous medium at room temperature and pressure, wherein the quantity of said reacting carbonate is 0.8 mole per mole of $ZrO_2$ contained in the basic zirconium sulfate and wherein said basic zirconium sulfate in the air-dried state contains 55% $ZrO_2$, 21.4% $SO_3$ and 23.6% $H_2O$.

6. The basic zirconium carbonate of claim 5 which contains up to 0.575 percent of contaminants.

* * * * *